United States Patent [19]
Suzuki et al.
[11] Patent Number: 4,806,265
[45] Date of Patent: Feb. 21, 1989

[54] AMORPHOUS FERROMAGNETIC OXIDES

[75] Inventors: Kenji Suzuki, 12-11, Shogen 11-chome, Izumi-shi, Miyagi-ken; Tsuyoshi Masumoto, 8-22, Kamisugi 3-chome, Sendai-shi, Miyagi-ken; Nobuhiro Ota, 76-3, Aza-Matsushima; Kurosaki, Muya-cho, Naruto-shi, Tokushima-ken; Mika Okubo, Tokushima; Masao Mitera, 24-39, Yoshinari 1-chome, Miyagi-cho, Miyagi-gun, Miyagi-ken; Akira Matsumoto, 6-72, Shironouchi, Tokushima-cho, Tokushima-shi, Tokushima-ken; Shuji Masuda, 27-8, Aza-Miyanomoto, Ejiri, Kitajima-cho, Itano-gun, Tokushima-ken, all of Japan

[73] Assignees: Research Development Corporation of Japan, Tokyo; Kenji Suzuki; Tsuyoshi Masumoto, both of Miyagi; Nobuhiro Ota, Tokushima; Masao Mitera, Miyagi; Akira Matsumoto; Shuji Masuda, both of Tokushima, all of Japan

[21] Appl. No.: 97,317

[22] Filed: Sep. 14, 1987

Related U.S. Application Data

[63] Continuation of Ser. No. 790,593, Oct. 23, 1985, abandoned.

[30] Foreign Application Priority Data

Oct. 24, 1984 [JP] Japan ................................ 59-224654

[51] Int. Cl.⁴ ............................................ C04B 35/26

[52] U.S. Cl. .............................. 252/62.63; 252/62.56; 252/62.57; 252/62.59; 252/62.6; 252/62.62; 252/62.64

[58] Field of Search ............... 252/62.56, 62.62, 62.63, 252/62.64, 62.57, 62.59, 62.6

[56] References Cited

U.S. PATENT DOCUMENTS

| | | | |
|---|---|---|---|
| 2,927,896 | 3/1960 | Bergmann | 252/62.56 |
| 3,053,770 | 9/1962 | Counts | 252/62.63 |
| 4,407,721 | 10/1983 | Koike et al. | 252/62.63 |
| 4,414,124 | 11/1983 | Endo et al. | 252/62.63 |

OTHER PUBLICATIONS

Saitama "Chem. Abstr.", vol. 99, 1983, 132229k.
Bogomolova et al. "Chem. Abstr.", vol. 99, 1983, 204275x.
Krumme et al. "Chem. Abstr.", vol. 101, 1984, 181427s.

*Primary Examiner*—Jack Cooper
*Attorney, Agent, or Firm*—Armstrong, Nikaido Marmelstein & Kubovcik

[57] ABSTRACT

This invention provides an amorphous ferromagnetic oxide represented by the formula $$A_x.(MmOn)_y.(Fe_2O_3)_z$$

wherein A represents at least one of $Bi_2O_3$, $V_2O_5$, $TeO_2$ and $GeO_2$; M represents at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3; $0<x\leqq 80$, $0<y\leqq 60$ and $5\leqq z\leqq 60$ and $x+y+z=100$, provided that when M is Co, $0<x<60$, $0<y<60$ and $40\leqq z\leqq 60$, and processes for preparing the same.

1 Claim, 5 Drawing Sheets

AMORPHOUS FERROMAGNETIC OXIDES

Figure 1:
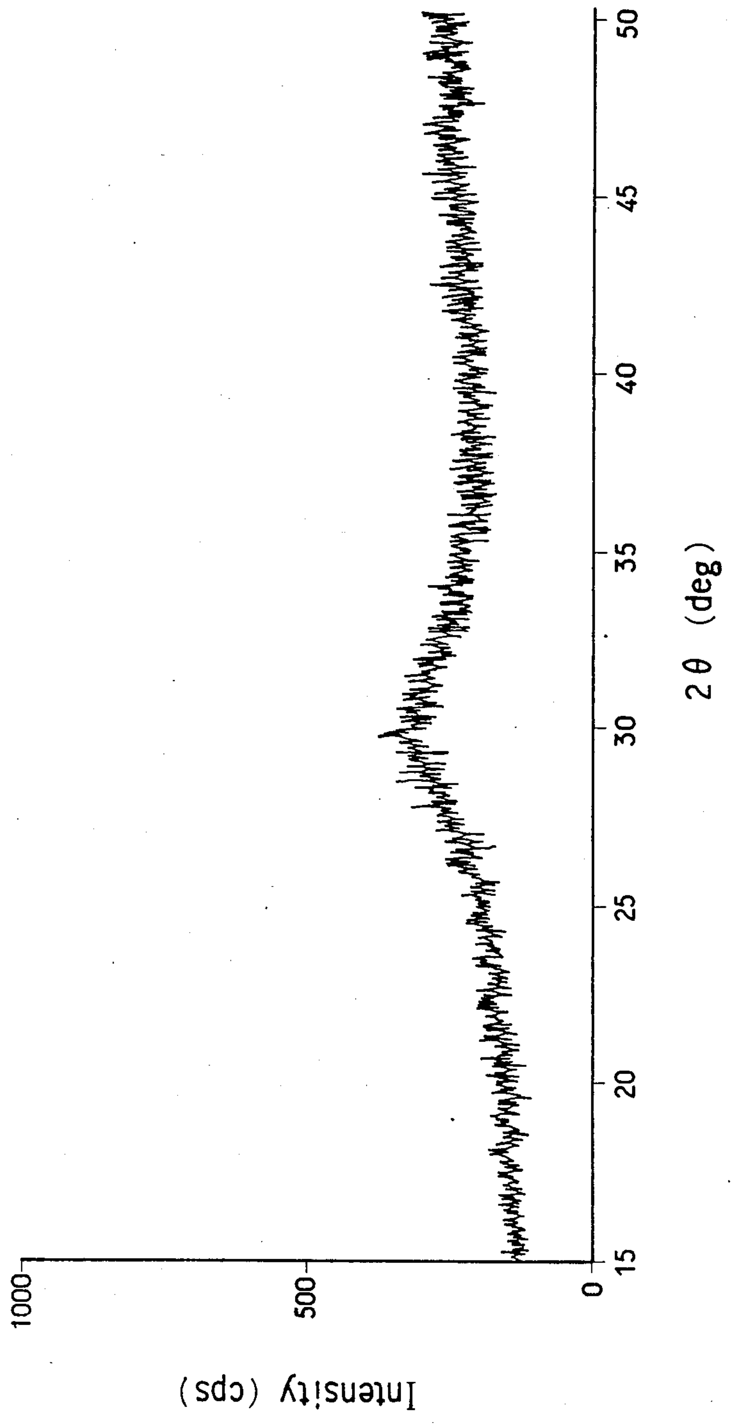

This application is a continuation of application Ser. No. 790,593 filed Oct. 23, 1985, now abandoned.

This invention relates to amorphous oxides having improved light transmission properties and ferromagnetism and to processes for preparing the same.

There is a great demand for multifunctional materials which perform a variety of functions, particularly for those which are highly responsive to the change of the light-magnetism-electricity relation, or more specifically for those which are outstanding in light transmission properties and ferromagnetism.

Methods are known for improving the light transmission properties of materials by rendering the materials amorphous. However, the methods involve the problem of reducing the magnetism of the material to a great extent.

Among the amorphous and magnetic oxides currently under investigations are those which are identical in composition with crystalline magnetic materials and those which have magnetic elements included in a stable glass matrix. Examples of the former oxides are $3GdO_3.5Fe_2O_3$ prepared by quenching on exposure to laser impact and known as having a relatively high magnetism. The oxides, however, exhibit a magnetization of about 1.5 emu/g and thus are unsatisfactory in this respect. Known oxides in this field include $ZnO.Fe_2O_3$, $CoO.Fe_2O_3$, $Y_3Fe_5O_{12}.Fe_2O_3$ and the like which are prepared by an aerosol method, and $Y_3Fe_5O_{12}$ which is prepared by a sputtering method or liquid quenching method. But these oxides are all paramagnetic. The latter oxides are those involving the use of $B_2O_3$, $SiO_2$ or $P_2O_5$ as a glass matrix. Of amorphous materials having $B_2O_3$ as the glass matrix, those prepared by a rapidly quenching method are known such as $xFe_2O_3.yBaO.zB_2O_3$ (x/y=39/48, 54/39, 63/32, and z=5 to 13), $xFe_2O_3.(1-x)[BaO.4B_2O_3(0<x<1)$, $xMn_2O_3.yBaO.zB_2O_3$ (x/y=65/29, 58/36, 44/51, and z=6), etc. These materials involve a Curie temperature of 100° K. or lower, and exhibit, for example in the case of $xMn_2O_3.yBaO.zB_2O_3$, a magnetization of about 10 emu/g at 4° K., hence unfit for use. Among conventional amorphous materials with $SiO_2$ as a glass matrix are $(1-x)SiO_2.xFe_2O_3$ ($0\leqq x\leqq 0.3$) prepared by an alkoxide-hydrolyzing method and $Na_2.3SiO_2.xFe_2O_3$ (x=0.1). But these materials are not ferromagnetic. Known amorphous materials with $P_2O_5$ as a glass matrix include $P_2O_5$-$Fe_2O_3$, $P_2O_5$-CoO, $P_2O_5$-MnO and the like prepared by a rapidly quenching method. These materials have a Neel temperature in low temperature range and are not ferromagnetic. Attempts have been made to prepare amorphous ferrite by a rapidly quenching process using a mixture of $P_2O_5$ and an oxide having a ferrite composition. The amorphous ferrite thus obtained has a magnetization of up to about 2 emu/g at room temperature, hence unsatisfactory.

As stated above, the methods for improving the light transmission properties of materials by change to amorphous structure give materials having greatly impaired magnetism and thus fail to produce multifunctional materials having suitable optical characteristics as desired and satisfactory magnetic characteristics.

We conducted extensive research to develop materails having improved light transmission properties and ferromagnetism and found that materials having remarkable light transmission properties and ferromagnetism can be prepared by converting a composite oxide of specific composition into an amorphous one.

This invention provides an amorphous ferromagnetic oxide represented by the formula $$A_x.(MmOn)_y.(Fe_2O_3)_z$$

wherein A represents at least one of $Bi_2O_3$, $V_2O_5$, $TeO_2$ and $GeO_2$; M represents at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3; $0<x\leqq 80$, $0<y\leqq 60$ and $5\leqq z\leqq 60$ and $x+y+z=100$, provided that when M is Co, $0<x<60$, $0<y<60$ and $40\leqq z\leqq 60$.

This invention also provides the following processes for preparing amorphous and ferromagnetic oxides:

(a) a process for preparing an amorphous ferromagnetic oxide represented by the formula $$A_x.(MmOn)_y.(Fe_2O_3)_z$$

wherein A represents at least one of $Bi_2O_3$, $V_2O_5$, $TeO_2$ and $GeO_2$; M represents at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3; $0<x\leqq 80$, $0<y\leqq 60$ and $5\leqq z\leqq 60$ and $x+y+z=100$, provided that when M is Co, $0<x<60$, $0<y<60$ and $40\leqq z\leqq 60$, the process comprising the steps of heating a mixture of at least one of $Bi_2O_3$, $V_2O_5$, $TeO_2$ and $GeO_2$; MmOn (wherein M is at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3); and $Fe_2O_3$ to a temperature higher than the melting point to obtain a melt and spouting the melt over a roll rotated at a high speed to quench it at a rate of $10^{3}$° C./sec or higher, (b) a process for preparing an amorphous ferromagnetic oxide represented by the formula $$A_x.(MmOn)_y.(Fe_2O_3)_z$$

wherein A represents at least one of $Bi_2O_3$, $V_2O_5$, $TeO_2$ and $GeO_2$; M represents at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3; $0<x\leqq 80$, $0<y\leqq 60$ and $5\leqq z\leqq 60$ and $x+y+z=100$, provided that when M is Co, $0<x<60$, $0<y<60$ and $40\leqq z\leqq 60$, the process comprising volatilizing a mixture of:

(i) at least one of Bi, V, Te, Ge and oxides thereof,
(ii) at least one of Mn, Fe, Co, Ni, Cu, Mg, Zn, Cd, Ca, Pb, Ba, Sr, rare earth elements and oxides thereof, and
(iii) Fe and/or $Fe_2O_3$ in an oxygen atmosphere for ionization to deposit a layer of the amorphous ferromagnetic oxide on a substrate, (c) a process for preparing an amorphous ferromagnetic oxide represented by the formula $$A_x.(MmOn)_y.(Fe_2O_3)_z$$

wherein A represents at least one of $Bi_2O_3$, $V_2O_5$, $TeO_2$ and $GeO_2$; M represents at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3; $0<x\leqq 80$, $0<y\leqq 60$ and $5\leqq z\leqq 60$ and $x+y+z=100$, provided that when M is Co, $0<x<60$, $0<y<60$ and $40\leqq z\leqq 60$, the process comprising sputtering a mixture of:

(i) at least one of Bi, V, Te, Ge and oxides thereof,
(ii) at least one of Mn, Fe, Co, Ni, Cu, Mg, Zn, Cd, Ca, Pb, Ba, Sr, rare earth elements and oxides thereof, and
(iii) Fe and/or $Fe_2O_3$ as a target in an oxygen-containing atmosphere to deposit a layer of the amorphous ferromagnetic oxide on a substrate, (d) a process for preparing an amorphous ferromagnetic oxide represented by the formula $$A_x.(MmOn)_y.(Fe_2O_3)_z$$

wherein A represents at least one of $Bi_2O_3$, $V_2O_5$, $TeO_2$ and $GeO_2$; M represents at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3; $0<x\leqq 80$, $0<y\leqq 60$ and $5\leqq z\leqq 60$ and $x+y+z=100$, provided that when M is Co, $0<x<60$, $0<y<60$ and $40\leqq z\leqq 60$, the process comprising the steps of heating a mixture of:

(i) at least one of Bi, V, Te and Ge,
(ii) at least one of Mn, Fe, Co, Ni, Cu, Mg, Zn, Cd, Ca, Pb, Ba, Sr and rare earth elements, and
(iii) Fe at a temperature higher than the melting point to obtain a melt, spouting the melt over a roll rotated at a high speed to quench it at a rate of $10^{3}$° C./sec or higher and oxidizing the resulting product at a temperature lower than the crystallization temperature, (e) a process for preparing an amorphous ferromagnetic oxide represented by the formula $$A_x.(MmOn)_y.(Fe_2O_3)_z$$

wherein A represents at least one of $Bi_2O_3$, $V_2O_5$, $TeO_2$ and $GeO_2$; M represents at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3; $0<x\leqq 80$, $0<y\leqq 60$ and $5\leqq z\leqq 60$ and $x+y+z=100$, provided that when M is Co, $0<x<60$, $0<y<60$ and $40\leqq z\leqq 60$, the process comprising the steps of volatilizing a mixture of:

(i) at least one of Bi, V, Te, Ge and oxides thereof,
(ii) at least one of Mn, Fe, Co, Ni, Cu, Mg, Zn, Cd, Ca, Pb, Ba, Sr, rare earth elements and oxides thereof, and
(iii) Fe and/or $Fe_2O_3$ in an evacuated or a rare gas atmosphere for ionization to deposit a layer of amorphous material on a substrate and oxidizing the layer at a temperature lower than the crystallization temperature, and (f) a process for preparing an amorphous ferromagnetic oxide represented by the formula $$A_x.(MmOn)_y.(Fe_2O_3)_z$$

wherein A represents at least one of $Bi_2O_3$, $V_2O_5$, $TeO_2$ and $GeO_2$; M represents at least one of Mn, Fe, Co, Ni, Cu, Mg, Zn, Cd, Ca, Pb, Ba, Sr and rare earth elements; when M is not a rare earth element, m=1 and n=1; when M is a rare earth element, m=2 and n=3; $0<x\leqq 80$, $0<y\leqq 60$ and $5\leqq z\leqq 60$ and $x+y+z=100$, provided that when M is Co, $0<x\leqq 60$, $0<y<60$ and $40\leqq z\leqq 60$, the process comprising the steps of sputtering a mixture of:

(i) at least one of Bi, V, Te, Ge and oxides thereof,
(ii) at least one of Mn, Fe, Co, Ni, Cu, Mg, Zn, Cd, Ca, Pb, Ba, Sr, rare earth elements and oxides thereof, and
(iii) Fe and/or $Fe_2O_3$ as a target in a rare gas to deposit a layer of amorphous material on a substrate and oxidizing the layer at a temperature lower than the crystallization temperature.

The oxides of this invention are represented by the formula $$A_x.(MmOn)_y.(Fe_2O_3)_z$$

wherein A represents at least one of $Bi_2O_3$, $V_2O_5$, $TeO_2$ and $GeO_2$; and M represents at least one of Mn, Fe, Co, Ni, Cu, Mg, Zn, Cd, Ca, Pb, Ba, Sr and rare earth elements. The rare earth elements represented by M are those which assume a garnet structure when reacted with $Fe_2O_3$ such as Y, Sm, Eu, Gd, Tb, Dy, Ho, Er, Tm, Yb and the like. The values of m and n are variable depending on the kind of M; when M is not a rare earth element, m=1 and n=1, and when M is a rare earth element, m=2 and n=3. The ranges of x, y and z are as follows; $0<x\leqq 80$, $0<y\leqq 60$ and $5\leqq z\leqq 60$, preferably $0<x\leqq 50$, $5\leqq y\leqq 60$, $40\leqq z\leqq 60$, and $x+y+z=100$, provided that when M is Co, $0<x<60$, $0<y<60$ and $40\leqq z\leqq 60$.

The oxides represented by the formula $A_x.(MmOn)_y.(Fe_2O_3)_z$ do not exhibit ferromagnetism when in a crystalline state. However, the change from the crystal structure to amorphous structure broadens the range of bond angle between Fe and O to intensify the extent of Fe-O-Fe superexchange interaction, whereby the oxide of the invention is rendered ferromagnetic. The ferromagnetic material thus produced, which is amorphous, is isotropic, far from being magnetically anisotropic, free from the irregularity of magnetization which would occur in a crystalline state due to the grain boundary and thus excellent as a ferromagnetic substance.

With the amorphous structure, the oxides of this invention, is optically isotropic, free from the light scattering attributable to the grain boundary in the crystal structure and consequently remarkable in light transmission properties.

The amorphous oxides of this invention have the foregoing characteristics which are attributable not to the producing process but to the composite oxide of specific composition in an amorphous state. In other words, the oxides of this invention can be produced by any of conventional processes capable of transforming the material to amorphous one. Examples of such processes are rapidly liquid quenching process, vacuum deposition process, sputtering process, ion-beam deposition process, cluster ion-beam deposition process, molecular beam epitaxial process, CVD process, sol-gel process, aerosol process, etc.

Of liquid quenching processes for preparing amorphous materials, known as suitable for use are processes in which a melt of materials is spouted over the surface of a roll rotated at a high speed to quench it. Specific examples of such processes are disclosed in Japanese Patent Applications Nos. 152562/1980; 160193/1980; 142197/1980; 211444/1983; 220916/1983; 210434/1983; 212061/1983; 64273/1983; 67463/1983; 65083/1983; 65003/1983; 66685/1983; 67462/1983; 69640/1983; 69641/1983; 66684/1983; 65004/1983; 68962/1983; 169208/1982; 79736/1983; 79739/1983, etc.

By way of example, a liquid quenching process for preparing the amorphous oxides of this invention will be specifically described below.

The oxides serving as the starting materials are mixed in the specified proportions and the mixture is calcined at a temperature close to the melting point to give a composition $A_x.(MmOn)_y.(Fe_2O_3)_z$. The composition thus obtained is filled into a crucible and heated in an atmosphere to a temperature preferably about 50° to about 200° C. higher than the melting point. The melt thus obtained is spouted over a roll rotated a high speed to quench it at a cooling rate of $10^{3°}$ to $10^{7°}$ C./sec, whereby an amorphous substance is afforded in the form of ribbon.

When metals are used in place of oxides as starting materials, a ribbon-like amorphous metal can be prepared under the same conditions as those in the liquid quenching process using the oxides as starting materials with the exception of carrying out the heating and spouting steps in an atmosphere of inert gas. Preferred crucibles useful for this purpose are those made of ceramics, graphite, fused quartz or the like. The amorphous oxide of this invention can be produced by oxidizing the resulting amorphous metal in air or oxygen. The oxidation is conducted by heating the metal at a temperature lower than the crystallization temperature of the resulting product, preferably lower by about 20° to about 50° C. The heat-treating time varies depending on the specific surface area of the metal, but is preferably in the range of about 3 to about 8 hours. The oxidation is effected in air or air mixed with $O_2$ gas to increase the $O_2$ concentration, or in an atmosphere of $O_2$ or $O_2$ mixed with an inert gas or the like. The inert gas-$O_2$ gas mixture preferably has an $O_2$ concentration of 20% or more which will serve to improve the oxidation efficiency.

The reactive cluster ion beam deposition process for preparing the oxides of this invention can be conducted, for example, in the following manner.

A mixture of metallic elements or oxides useful as starting materials is placed in the crucible of a cluster ion-beam deposition device. The chamber in the device is evacuated preferably to a vacuum of approximately $1\times10^{-5}$ to $5\times10^{-7}$ torr and an oxygen gas is introduced to elevate the pressure preferably to approximately $5\times10^{-5}$ to $1\times10^{-3}$ torr at which the chamber is maintained. The mixture in the crucible is heated to produce a vapor which is ionized by passage of an electric current to the ionization filament and ion accelerator disposed over the crucible. The ions are accelerated to deposit on a substrate made of glass or the like. When metallic elements are used as starting materials, the ionized metallic elements are reacted with an oxygen gas to produce oxides. Amorphous ferromagnetic oxides having a specific composition can be prepared by adjusting the crucible temperature to change the relative amounts of vaporized components.

A cluster ion-beam deposition can be performed under a highly evacuated condition or in an atmosphere of rare gas introduced, in place of oxygen gas, preferably to a pressure of approximately $5\times10^{-5}$ to $1\times10^{-3}$ torr into the cluster ion-beam deposition device and under the other conditions similar to those stated above. This process gives amorphous metals or oxygen-deficient amorphous oxides. The cluster ion-beam deposition in an atmosphere of oxygen may produce oxygen-deficient amorphous oxides, depending on the composition of elements. In this case, the oxidation is conducted under the same conditions as those stated abve for the oxidation of amorphous metals prepared by the liquid quenching process. Preferred oxidation time is about 1 to about 5 hours.

An example of sputtering processes, which are also employable for preparing the amorphous oxides of this invention, will be described below.

A mixture of metallic elements or metallic oxides used as starting materials is placed as a target in a sputtering device. The chamber of the device thus arranged is evacuated preferably to a high vacuum of approximately $1\times10^{-6}$ torr or less to remove the impure gases and adsorbed molecules, followed by feed of an oxygen gas into the chamber. The oxygen gas may be introduced singly or preferably in mixture with a rare gas to increase the sputtering efficiency which in turn elevates the rate of deposition. The mixture of oxygen and rare gas is used in an oxygen/rare gas ratio of at least 1/1 which is required to deposit an amorphous oxide on a substrate. The oxygen or oxygen-rare gas mixture is introduced into the device preferably to a pressure of approximately $1\times10^{-1}$ to $1\times10^{-3}$ torr. A pressure lower than $1\times10^{-3}$ torr leads to reduction in sputtering efficiency and thus in deposition rate, and a pressure higher than $1\times10^{-1}$ torr results in impairment of deposition, hence undesirable. After stabilization of gas pressure, voltage is applied to a power source to cause discharge by which the gas is ionized to sputter the target, depositing a film on a substrate. The coated substrate is cooled with water or a cooling medium to render the film amorphous. Preferred temperature of the substrate is room temperature or lower.

The sputtering can be carried out by supplying into the device a rare gas alone instead of an oxygen gas to a pressure of about $1\times10^{-1}$ to about $1\times10^{-3}$ torr and employing the other conditions similar to those described above. The foregoing sputtering process produces amorphous metals or oxygen-deficient amorphous oxides. A sputtering process using an oxygen gas may also afford oxygen-deficient amorphous oxides, depending on the composition of starting elements. In these sputtering processes, the oxidation is effected under the same conditions as those for the oxidation of amorphous metals prepared by the liquid quenching process. Preferred oxidation time is about 1 to about 5 hours.

The amorphous ferromagnetic oxides of this invention can be prepared from widely variable compositions of elements because of the oxides being amorphous. Thus it is possible to easily produce oxides having the desired degree of magnetic characteristics according to a specific application.

The oxides of this invention have a magnetically and optically isotropic body for which the amorphous structure of the oxide is responsible, and the oxides are free from the irregularity of magnetism and the light scattering which otherwise would occur due to the grain boundary. With these properties, the oxides of the invention are outstanding in the characteristics required of magnetic materials and in light transmission properties and are highly sensitive, optical and magnetic exchangers.

The oxides of this invention find a wide variety of applications in various fields as materials having optical and magnetic functions or as multifunctional materials responsive to the change of light-magnetism-electricity relation.

The present invention will be described below in more detail with reference to the following examples and reference examples.

EXAMPLES 1 TO 38 AND REFERENCE EXAMPLES 1 AND 2

The components (99.9% purity) as shown below in Table 1 were mixed in the proportions listed therein and the mixture was calcined and thereafter heated in a crucible of platinum having a slit nozzle 0.1 mmm in width and 4 mm in length with high frequency heating to obtain a melt. The melt was spouted by compressed air at a pressure of 0.5 $kg/cm^2$ over a rotor of copper rotating at a high speed. During spouting, the nozzle of the crucible was set at a position about 0.1 mm away from the rotor. The samples thus obtained had a widh of 4 mm, a length of 10 to 50 mm and a thickness of 5 to 10 $\mu m$ which varied depending on the composition of components. The samples were all brown to black and were of thin strip with light transmitting properties. A powder X-ray diffraction confirmed that the samples were amorphous. Table 1 below shows the composition of components, cooling rate and amount of magnetization at room temperature. The cooling rate was determined according to the heating temperature, circumferential velocity of the rotor and spouting pressure.

Figure 2:
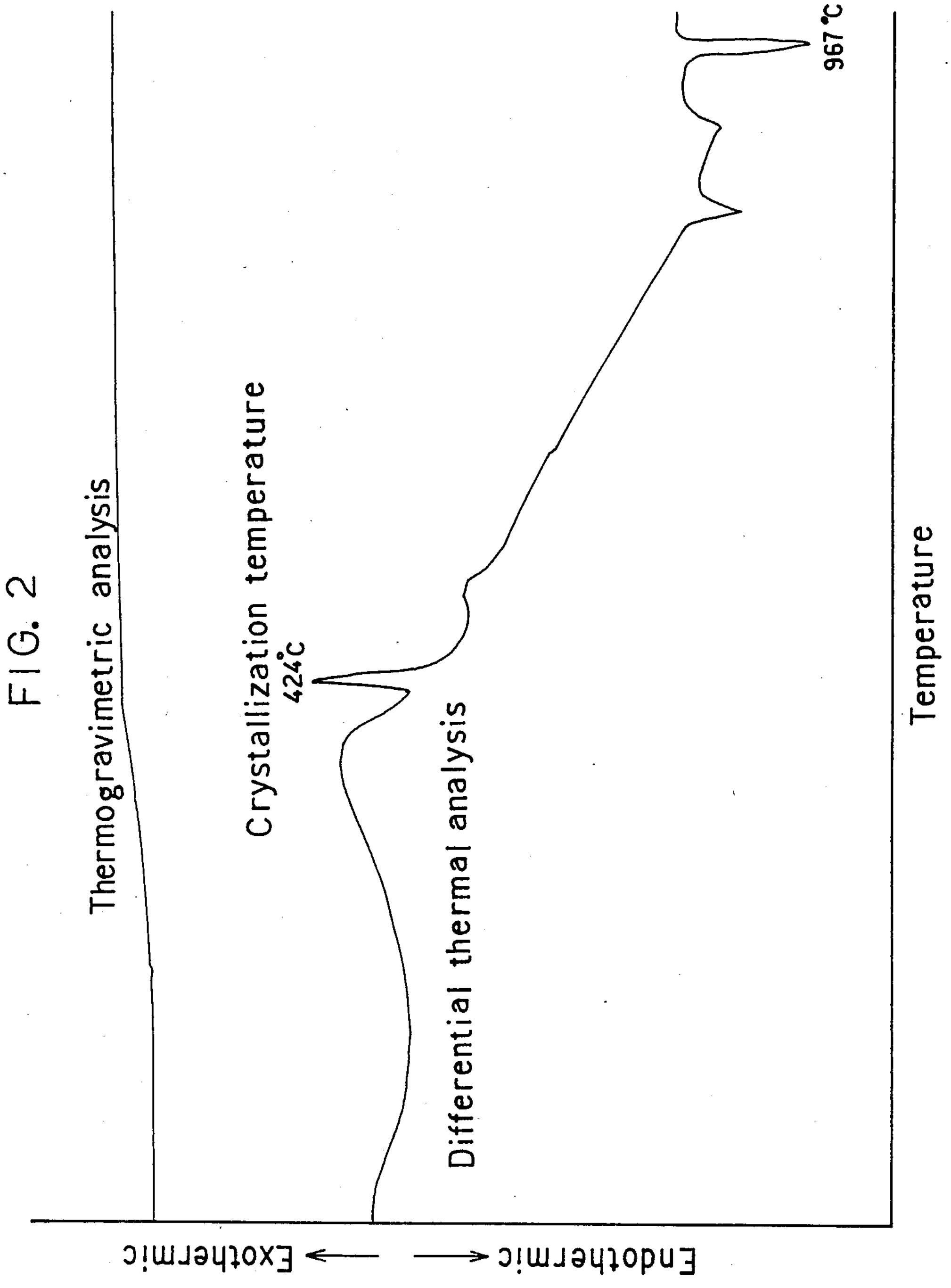
Figure 3:
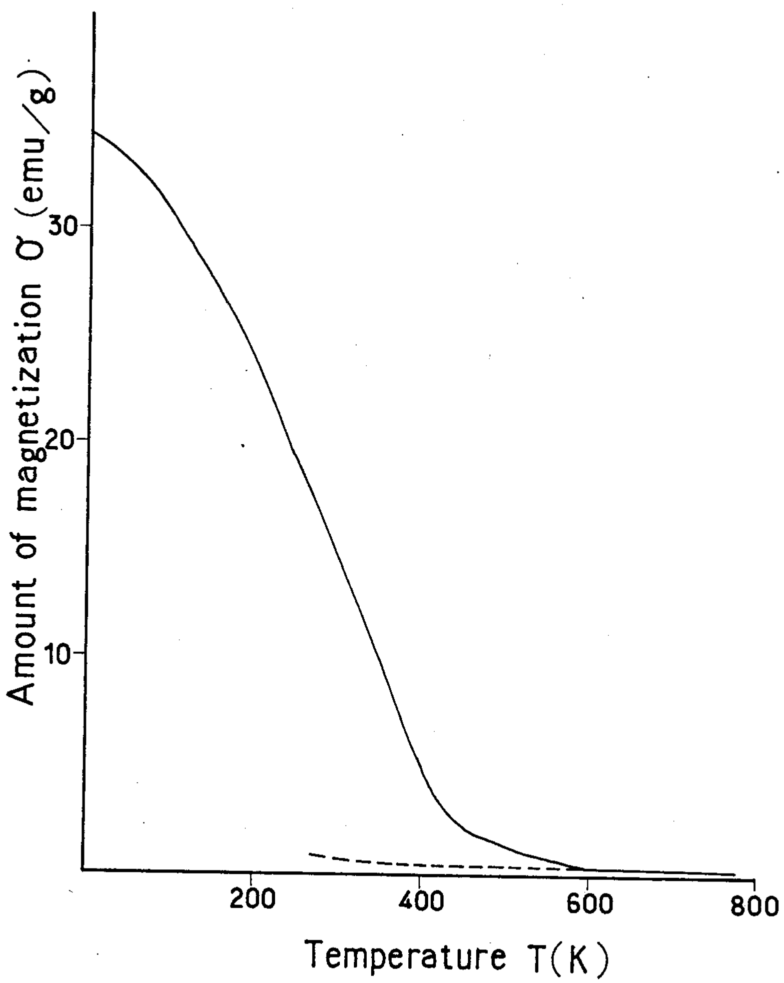
Figure 4:
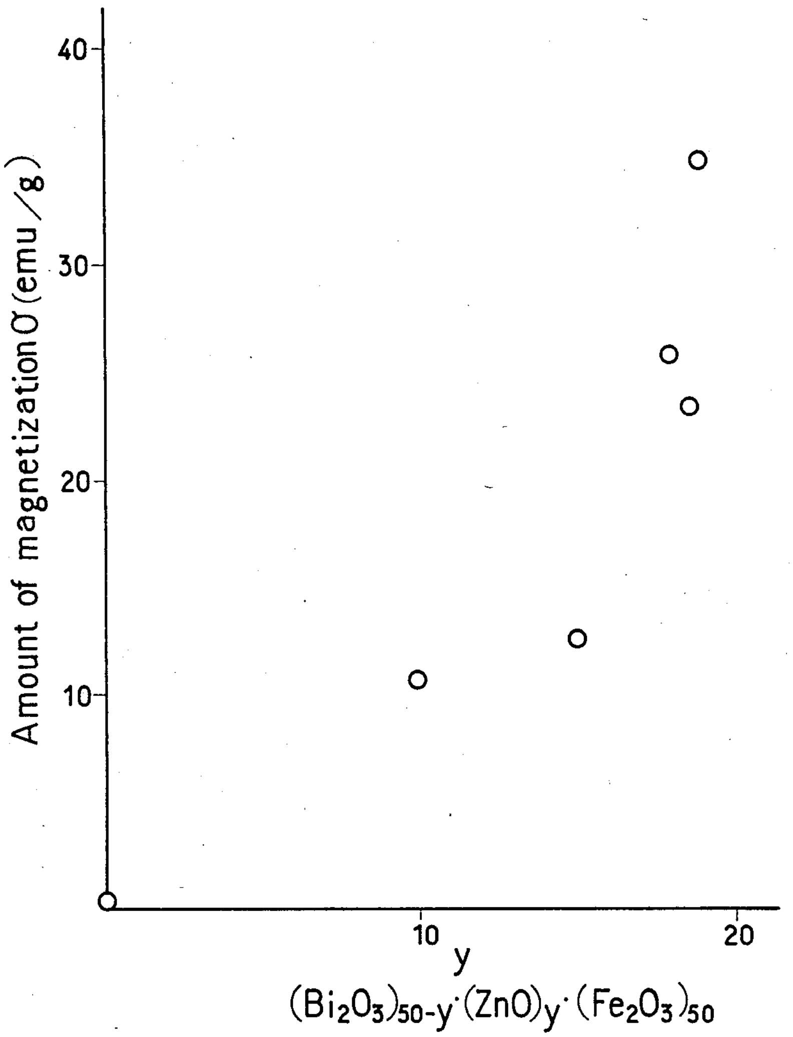
Figure 6:
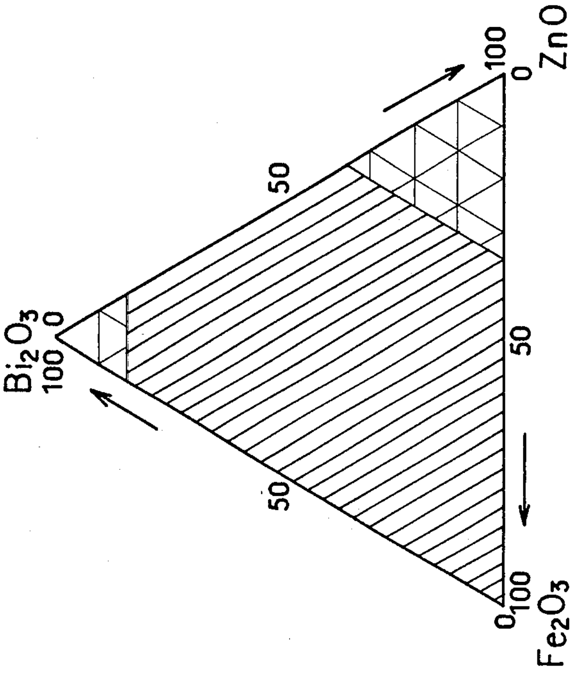
Figure 5:
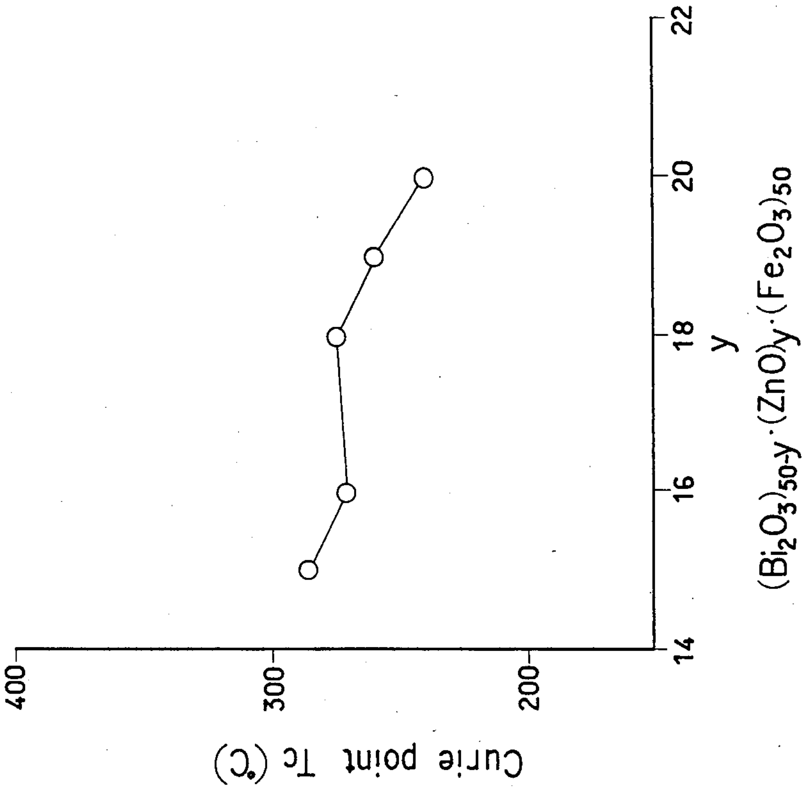

FIG. 1 is a powder X-ray diffraction pattern and FIG. 2 is a graph showing the results of differential thermal analysis and thermogravimetric analysis, in respect of the sample prepared from $(Bi_2O_3)_{30}$.(-$ZnO)_{20}.(Fe_2O_3)_{50}$ in Example 1. FIG. 3 is a graph showing the relationship between the temperature and the amount of magnetization at room temperature in respect of the crystalline material and amorphous material having a composition of $(Bi_2O_3)_{30}.(ZnO)_{20}.(Fe_2O_3)_{50}$. The solid line and broken line in FIG. 3 are intended for the amorphous material and the crystalline material, repectively. FIG. 4 is a graph showing the relationship between the the composition of amorphous material $(Bi_2O_3)_{50-y}.(ZnO)_y.(Fe_2O_3)_{50}$ and amount of magnetization at room temperature and FIG. 5 is a graph showing the relationship between the composition thereof and the Curie temperature thereof. FIG. 6 indicates the amorphous range of oxide of $Bi_2O_3$-$ZnO$-$Fe_2O_3$ with oblique lines in a triangular diagram showing the composition of components in terms of mole ratio.

The sample of Reference Example 2 has a crystal structure.

TABLE 1

| | Composition | x | y | z | Cooling rate (°C. /sec.) | Amount of magnetization (emu/g) |
|---|---|---|---|---|---|---|
| Ex. 1 | $(Bi_2O_3)_x.(ZnO)_y.(Fe_2O_3)_z$ | 30 | 20 | 50 | $10^6$ | 35 |
| Ex. 2 | $(Bi_2O_3)_x.(MnO)_y.(Fe_2O_3)_z$ | 30 | 20 | 50 | $10^6$ | 40 |
| Ex. 3 | $(Bi_2O_3)_x.(FeO)_y.(Fe_2O_3)_z$ | 10 | 40 | 50 | $10^3$ | 20 |
| Ex. 4 | $(Bi_2O_3)_x.(CoO)_y.(Fe_2O_3)_z$ | 30 | 20 | 50 | $10^4$ | 38 |
| Ex. 5 | $(Bi_2O_3)_x.(NiO)_y.(Fe_2O_3)_z$ | 30 | 20 | 50 | $10^5$ | 36 |
| Ex. 6 | $(Bi_2O_3)_x.(CuO)_y.(Fe_2O_3)_z$ | 30 | 15 | 55 | $10^6$ | 25 |
| Ex. 7 | $(Bi_2O_3)_x.(MgO)_y.(Fe_2O_3)_z$ | 45 | 5 | 50 | $10^4$ | 22 |
| Ex. 8 | $(Bi_2O_3)_x.(CdO)_y.(Fe_2O_3)_z$ | 20 | 30 | 50 | $10^3$ | 33 |
| Ex. 9 | $(Bi_2O_3)_x.(CaO)_y.(Fe_2O_3)_z$ | 30 | 20 | 50 | $10^5$ | 15 |
| Ex. 10 | $(Bi_2O_3)_x.(PbO)_y.(Fe_2O_3)_z$ | 10 | 30 | 60 | $10^6$ | 49 |
| Ex. 11 | $(Bi_2O_3)_x.(BaO)_y.(Fe_2O_3)_z$ | 40 | 10 | 50 | $10^5$ | 18 |
| Ex. 12 | $(Bi_2O_3)_x.(SrO)_y.(Fe_2O_3)_z$ | 40 | 10 | 50 | $10^5$ | 17 |
| Ex. 13 | $(Bi_2O_3)_x.(Y_2O_3)_y.(Fe_2O_3)_z$ | 14 | 29 | 57 | $10^3$ | 10 |
| Ex. 14 | $(Bi_2O_3)_x.(Gd_2O_3)_y.(Fe_2O_3)_z$ | 14 | 29 | 57 | $10^4$ | 13 |
| Ex. 15 | $(GeO_2)_x.(ZnO)_y.(Fe_2O_3)_z$ | 5 | 45 | 50 | $10^6$ | 30 |
| Ex. 16 | $(GeO_2)_x.(MnO)_y.(Fe_2O_3)_z$ | 7 | 43 | 50 | $10^5$ | 32 |
| Ex. 17 | $(GeO_2)_x.(FeO)_y.(Fe_2O_3)_z$ | 30 | 20 | 50 | $10^3$ | 21 |
| Ex. 18 | $(GeO_2)_x.(CaO)_y.(Fe_2O_3)_z$ | 40 | 15 | 45 | $10^3$ | 15 |
| Ex. 19 | $(GeO_2)_x.(CuO)_y.(Fe_2O_3)_z$ | 30 | 10 | 60 | $10^3$ | 24 |
| Ex. 20 | $(GeO_2)_x.(CdO)_y.(Fe_2O_3)_z$ | 5 | 45 | 50 | $10^6$ | 36 |
| Ex. 21 | $(GeO_2)_x.(Y_2O_3)_y.(Fe_2O_3)_z$ | 20 | 25 | 55 | $10^4$ | 8 |
| Ex. 22 | $(GeO_2)_x.(PbO)_y.(Fe_2O_3)_z$ | 20 | 20 | 60 | $10^5$ | 39 |
| Ex. 23 | $(GeO_2)_x.(CoO)_y.(Fe_2O_3)_z$ | 40 | 15 | 45 | $10^5$ | 11 |
| Ex. 24 | $(TeO_2)_x.(ZnO)_y.(Fe_2O_3)_z$ | 25 | 25 | 50 | $10^6$ | 30 |
| Ex. 25 | $(TeO_2)_x.(CdO)_y.(Fe_2O_3)_z$ | 30 | 25 | 45 | $10^3$ | 27 |
| Ex. 26 | $(TeO_2)_x.(CaO)_y.(Fe_2O_3)_z$ | 25 | 20 | 55 | $10^5$ | 15 |
| Ex. 27 | $(TeO_2)_x.(CuO)_y.(Fe_2O_3)_z$ | 10 | 30 | 60 | $10^4$ | 17 |
| Ex. 28 | $(TeO_2)_x.(CoO)_y.(Fe_2O_3)_z$ | 40 | 15 | 45 | $10^5$ | 17 |
| Ex. 29 | $(V_2O_5)_x.(Y_2O_3)_y.(Fe_2O_3)_z$ | 10 | 30 | 60 | $10^6$ | 9 |
| Ex. 30 | $(V_2O_5)_x.(MnO)_y.(Fe_2O_3)_z$ | 25 | 20 | 55 | $10^6$ | 31 |
| Ex. 31 | $(V_2O_5)_x.(MgO)_y.(Fe_2O_3)_z$ | 30 | 20 | 50 | $10^3$ | 23 |
| Ex. 32 | $(V_2O_5)_x.(BaO)_y.(Fe_2O_3)_z$ | 30 | 20 | 50 | $10^5$ | 34 |
| Ex. 33 | $(V_2O_5)_x.(CoO)_y.(Fe_2O_3)_z$ | 30 | 20 | 50 | $10^5$ | 13 |
| Ex. 34 | $[(Bi_2O_3)_{0.5}.(TeO_2)_{0.5}]_x.(CdO)_y.(Fe_2O_3)_z$ | 20 | 30 | 50 | $10^6$ | 28 |
| Ex. 35 | $[(Bi_2O_3)_{0.5}.(V_2O_5)_{0.5}]_x.(ZnO)_y.(Fe_2O_3)_z$ | 30 | 20 | 50 | $10^6$ | 30 |
| Ex. 36 | $(Bi_2O_3)_x.[(ZnO)_{0.5}.(Nd_2O_3)_{0.5}]_y.(Fe_2O_3)_z$ | 30 | 20 | 50 | $10^6$ | 42 |
| Ex. 37 | $(Bi_2O_3)_x.[(CdO)_{0.75}.(Sm_2O_3)_{0.25}]_y.(Fe_2O_3)_z$ | 30 | 20 | 50 | $10^6$ | 45 |
| Ex. 38 | $(Bi_2O_3)_x.[(ZnO)_{0.2}.(Nd_2O_3)_{0.6}.(Sm_2O_3)_{0.2}]_y.(Fe_2O_3)_z$ | 30 | 20 | 50 | $10^6$ | 47 |
| Comp. Ex. 1 | $(Bi_2O_3)_x.(ZnO)_y.(Fe_2O_3)_z$ | 85 | 7.5 | 7.5 | $10^5$ | 0.1 |
| Comp. Ex. 2 | $(Bi_2O_3)_x.(ZnO)_y.(Fe_2O_3)_z$ | 15 | 65 | 20 | $10^6$ | 0.2 |

Table 1 shows that the amorphous oxides of this invention exhibit large amounts of magnetization at room temperature.

EXAMPLES 39 TO 64

Metallic elements (99.9% purity) were placed into a container made of zirconia which was then disposed at a given position in a cluster ion-beam deposition device. The chamber in the device was evacuated to a vacuum of $1\times10^{-6}$ torr and an oxygen gas was introduced to a vacuum of $1\times10^{-4}$ torr at which the chamber was maintained. The metallic elements in the zirconia container were heated by a resistance heating means to volatilize and the vapor was subjected to to a reactive cluster ion-beam deposition, depositing a film on a glass substrate. The elements in the zirconia container were heated at various temperatures to adjust the amount of vaporized elements, thereby giving oxides of different compositions.

The oxides thus obtained were in the form of brown to black, translucent and amorphous films. The films were analyzed by an X-ray microanalyzer. A powder X-ray diffraction confirmed that the films were amorphous. The analysis revealed that the tested elements were rendered amorphous over substantially the entire range of composition. Table 2 below shows the composition of the samples and the amount of magnetization at room temperature.

TABLE 2

| | Composition | x | y | z | Amount of magnetization (emu/g) |
|---|---|---|---|---|---|
| Ex. 39 | $(Bi_2O_3)_x.(ZnO)_y.(Fe_2O_3)_z$ | 30 | 20 | 50 | 36 |
| Ex. 40 | $(Bi_2O_3)_x.(CdO)_y.(Fe_2O_3)_2$ | 20 | 30 | 50 | 35 |
| Ex. 41 | $(Bi_2O_3)_x.(MnO)_y.(Fe_2O_3)_z$ | 30 | 20 | 50 | 31 |
| Ex. 42 | $(Bi_2O_3)_x.(NiO)_y.(Fe_2O_3)_z$ | 30 | 20 | 50 | 27 |
| Ex. 43 | $(Bi_2O_3)_x.(CuO)_y.(Fe_2O_3)_z$ | 30 | 15 | 55 | 12 |
| Ex. 44 | $(Bi_2O_3)_x.(PbO)_y.(Fe_2O_3)_z$ | 10 | 30 | 60 | 40 |
| Ex. 45 | $(Bi_2O_3)_x.(SrO)_y.(Fe_2O_3)_z$ | 40 | 10 | 50 | 11 |
| Ex. 46 | $(Bi_2O_3)_x.(Y_2O_3)_y.(Fe_2O_3)_z$ | 14 | 29 | 57 | 11 |
| Ex. 47 | $(GeO_2)_x.(ZnO)_y.(Fe_2O_3)_z$ | 5 | 45 | 50 | 33 |
| Ex. 48 | $(GeO_2)_x.(CdO)_y.(Fe_2O_3)_z$ | 5 | 45 | 50 | 34 |
| Ex. 49 | $(GeO_2)_x.(MnO)_y.(Fe_2O_3)_z$ | 7 | 43 | 50 | 27 |
| Ex. 50 | $(GeO_2)_x.(Y_2O_3)_y.(Fe_2O_3)_z$ | 10 | 35 | 55 | 10 |
| Ex. 51 | $(TeO_2)_x.(ZnO)_y.(Fe_2O_3)_z$ | 20 | 30 | 50 | 35 |
| Ex. 52 | $(TeO_2)_x.(CdO)_y.(Fe_2O_3)_z$ | 35 | 20 | 45 | 32 |
| Ex. 53 | $(TeO_2)_x.(CaO)_y.(Fe_2O_3)_z$ | 15 | 30 | 55 | 21 |
| Ex. 54 | $(TeO_2)_x.(CuO)_y.(Fe_2O_3)_z$ | 15 | 35 | 60 | 17 |
| Ex. 55 | $(V_2O_5)_x.(Y_2O_3)_y.(Fe_2O_3)_z$ | 15 | 30 | 55 | 7 |
| Ex. 56 | $(V_2O_5)_x.(MnO)_y.(Fe_2O_3)_z$ | 30 | 20 | 50 | 22 |
| Ex. 57 | $(V_2O_5)_x.(MgO)_y.(Fe_2O_3)_z$ | 35 | 15 | 50 | 21 |
| Ex. 58 | $(V_2O_5)_x.(BaO)_y.(Fe_2O_3)_z$ | 25 | 25 | 50 | 35 |
| Ex. 59 | $(V_2O_5)_x.(CoO)_y.(Fe_2O_3)_z$ | 10 | 40 | 50 | 28 |
| Ex. 60 | $(V_2O_2)_x.(CoO)_y.(Fe_2O_3)_z$ | 15 | 30 | 55 | 24 |
| Ex. 61 | $(GeO_2)_x.(CoO)_y.(Fe_2O_3)_z$ | 5 | 40 | 55 | 30 |
| Ex. 62 | $(Bi_2O_3)_x.[(ZnO)_{0.5}.(MnO)_{0.5}]_y.(Fe_2O_3)_z$ | 30 | 20 | 50 | 39 |
| Ex. 63 | $(Bi_2O_3)_x.[(ZnO)_{0.5}.(Nd_2O_3)_{0.5}]_y.(Fe_2O_3)_z$ | 30 | 20 | 50 | 48 |
| Ex. 64 | $(Bi_2O_3)_x.[(ZnO)_{0.17}.(Nd_2O_3)_{0.5}.(Sm_2O_3)_{0.33}]_y.(Fe_2O_3)_z$ | 30 | 20 | 50 | 41 |

Table 2 reveals that the amorphous oxides of this invention produced by the foregoing deposition exhibit great amounts of magnetization at room temperature.

EXAMPLES 65 TO 68

Sintered oxides having the composition listed below in Table 3 were processed into a disk which was polished to give a smooth surface. The disk was disposed at a target position in a high frequency sputtering device into which a substrate of non-alkali glass was set. The chamber in the device was evacuated vaccum of $2.1\times10^{-5}$ torr. A gas of Ar-$O_2$ mixture (1:1) was introduced into the chamber to a pressure of $3.5\times10^{-2}$ torr. When the gas pressure became stable, voltage was applied at 2 kW to a high frequency power source to rotate the substrate and the target at 10 rpm and 3 rpm, respectively, whereby sputtering was performed with the substrate at 10° C., affording a film of amorphous ferromagnetic oxide. Table 3 below also shows the composition of the samples and the amount of magnetization at room temperature.

TABLE 3

| | Composition | x | y | z | Amount of magnetization (emu/g) |
|---|---|---|---|---|---|
| Ex. 65 | $(Bi_2O_3)_x.(CoO)_y.(Fe_2O_3)_z$ | 30 | 20 | 50 | 43 |
| Ex. 66 | $(Bi_2O_3)_x.[(ZnO)_{0.5}.(MnO)_{0.5}]_y.(Fe_2O_3)_z$ | 30 | 20 | 50 | 40 |
| Ex. 67 | $(Bi_2O_3)_x.[(ZnO)_{0.5}.(Nd_2O_3)_{0.5}]_y.(Fe_2O_3)_z$ | 30 | 20 | 50 | 45 |
| Ex. 68 | $(Bi_2O_3)_x.[(ZnO)_{0.17}.(Nd_2O_3)_{0.5}.(Sm_2O_3)_{0.33}].(Fe_2O_3)_z$ | 30 | 20 | 50 | 43 |

EXAMPLE 69

A mixture of Bi, Zn and Fe was melted in a Bi/Zn/Fe ratio (atom) of 36.2:23.9:39.9 with heating within a vacuum melting furnace to produce an alloy. The alloy was filled into a quartz tube having a slit formed at its bottom and measuring 4 mm in length and 0.3 mm in width. The tube was mounted on a quenching means which was then evacuated to a vacuum of $3\times10^{-4}$ torr and into which an Ar gas was supplied to provide an atmosphere of Ar gas (1 atm.). The alloy in the quartz tube was melted with high frequency heating. The melt thus obtained was sprayed under an Ar gas pressure of 0.5 kg/cm$^2$ over the surface of a roll rotated at 3000 rpm and became quenched at a rate of $10^{6}$° C./sec, affording a ribbon-like amorphous alloy.

The amorphous ribbon-like alloy obtained above was heated in air at 300° C. for 3 hours to give an amorphous ferromagnetic oxide having a composition of $(Bi_2O_3)_{30}(ZnO)_{20}(Fe_2O_3)_{50}$. The oxide was found to have a magnetization of 39 emu/g at room temperature.

EXAMPLE 70

Metal pieces each of Bi, Mn and Fe were polished to give a smooth surface and then cut into a shape of fan. The fan-shaped pieces were disposed as a target into a high frequency sputtering device and arranged in the order of Bi, Mn and Fe along the diagonal lines. The pieces were adjusted to a surface area in a Bi/Mn/Fe ratio of 36:24:40. A substrate of non-alkali glass was disposed in the device. The chamber in the device was evacuated to $1.3\times10^{-6}$ torr and Ar gas was introduced into the chamber to a pressure of $1.2\times10^{-3}$ torr. After the internal pressure was stabilized, voltage was applied to a high frequency power source to effect sputtering at 1.5 kW for 8 hours with the substrate at −15° C. A film formed on the substrate was found to have a composition in a Bi/Mn/Fe ratio of 35:25:40.

The film of amorphous Bi-Mn-Fe alloy was oxidized in air at 300° C. for 5 hours, affording an amorphous ferromagnetic oxide having a composition of $(Bi_2O_3)_{28.75}.(MnO)_{21.56}.(Fe_2O_3)_{49.69}$. The oxide was found to have a magnetization of 42 emu/g at room temperature.

We claim:

1. An amorphous ferromagnetic oxide which is magnetically and optically isotropic, represented by the formula $$A_x \cdot (M)_y (Fe_2O_3)_z$$

wherein A represents $Bi_2O_3$; M represents ZnO, MgO, CdO, CaO, or mixtures thereof $0x \leqq 80$, $0<y \leqq 60$, $5 \leqq z \leqq 60$ and $x+y+z=100$; and wherein the oxide represented by said formula does not exhibit ferromagnetism when in a crystalline state.

* * * * *